Patented June 28, 1938

2,122,011

UNITED STATES PATENT OFFICE 2,122,011

DENTAL FILLING COMPOSITION

Friedrich Schoenbeck, Berlin-Biesenthal, and Erich Czapp, Berlin, Germany

No Drawing. Application April 15, 1935, Serial No. 16,532. In Germany April 17, 1934

9 Claims. (Cl. 106—6)

This invention relates to the production of a dental filling substance. Phosphate and silicate cements commonly used for this purpose have the disadvantage that the fillings which they produce lack strength at the edges. Consequently, difficulties arise in connection with the building up of corners and cutting edges. Silicate cements especially exhibit this defect. The deficient durability of tooth-fillings is primarily to be ascribed to miss-bites. In comparison with this kind of stress, the other influences such as the grinding action of the opposite tooth or other mechanical actions become less important. It is therefore necessary to have available cements which possess a high strength under impact.

To increase the hardness of tooth-filling materials, it has already been proposed to mix, with the filling material, quartz, ferro-silicon, silicon carbide, crystalline carbon in the form of diamond, and the like. However, it is not possible in this fashion to increase sufficiently the strength under impact of tooth-cements.

The present invention has for object to enhance the strength under impact of dental cements or filling substances by reinforcement, after the principle of reinforcement adopted in ferro-concrete formations.

According to the invention the strength under impact is increased by the addition of inorganic or organic substances which are introduced in thread-wire or fibre-form into the cement or into one or more of its components, i. e. also into the cement liquid. The use of additions in fibre-form or in some other form with pronounced elongation is not the only course indicated, however, but the cement-powder itself can be produced wholly or partly in fibre-form and then, if necessary, it may also be mixed with additions in fibre-form. If the cement is based upon a fused mass, it is simply possible to produce this in fibre-form and either to introduce it as an addition to the cement or to one or more of its components, or to use it alone.

The quantity of the addition depends upon the nature of the fibre-material or filaments.

Advantageously use is made of such substances as have lost their swelling or absorptive powers due to suitable treatment. Cellulose, for instance, may be rendered non-swelling and non-absorptive by treatment with acetyl cellulose in a manner well known in the art.

The invention has no connection with the known filling of the tooth-root ducts with fibrous material such as asbestos, cellulose and so forth, which then serves entirely different purposes.

In German specification No. 127,587, it has already been proposed to add celluloid in the swollen condition to the cement powder or cement liquid, in order to improve the polishing powers of the tooth filling. To work the celluloid into the cement liquid, it is dissolved in organic solvents and precipitated by acids. Naturally, then, the celluloid is not, as stated in the patent, precipitated in the form of fibres, but as a slimy mass. Also when it is worked up with the cement powder, the celluloid is not added in fibre-form, but as a powder obtained from rasping, i. e. in a form in which the elongation of the particles no longer predominates.

*Example of operation*

1 grm. of cement powder is combined with about 13% of cellulose (wadding or the like) which is preferably no longer capable of swelling and absorption. After the cement has set, an increase of the impact-strength to 2½ times is observed, a value which well suffices for conditions in the mouth. With the same or similar success use may be made, for example, of artificial silk, glass-wool, spun artificial resin, platinum wire and the like.

As employed in the appended claims, the term "dental cement" refers to materials capable of setting with a degree of hardness and durability suited for, and intended for use as, materials for permanent dental fillings.

We claim:—

1. Manufacture of a dental cement of the setting type distinguished by the incorporation in such cement of cellulose filaments treated to render them non-swelling and non-absorptive.

2. Manufacture of a dental cement of the setting type distinguished by the incorporation in such cement of cellulose filaments treated with acetyl cellulose to render them non-swelling and non-absorptive.

3. A dental cement comprising a cementitious ingredient selected from the group consisting of phosphates and silicates, and a non-absorptive, filamentary reinforcing ingredient selected from the group consisting of artificial silk, glass-wool, spun artificial resin, platinum wire, and cellulose fibres rendered non-absorptive by treatment.

4. A dental cement comprising a cementitious ingredient selected from the group consisting of phosphates and silicates, and a filamentary reinforcing ingredient comprising cellulose fibres rendered non-absorptive by treatment with acetyl cellulose.

5. A dental cement of the setting type comprising a cementitious ingredient and a non-absorptive filamentary reinforcing ingredient comprising cellulose fibres rendered non-absorptive by treatment.

6. A dental cement of the setting type comprising a cementitious ingredient and a non-absorptive filamentary reinforcing ingredient comprising cellulose fibres rendered non-absorptive by treatment with acetyl cellulose.

7. A dental cement comprising a phosphate cement and a non-absorptive filamentary reinforcing ingredient comprising cellulose fibres rendered non-absorptive by treatment with acetyl cellulose.

8. A dental cement comprising a silicate cement and a non-absorptive filamentary reinforcing ingredient comprising cellulose fibres rendered non-absorptive by treatment with acetyl cellulose.

9. A dental cement of the setting type comprising a cementitious ingredient and a non-absorptive filamentary reinforcing ingredient selected from the group consisting of artificial silk, glass-wool, spun artificial resin, platinum wire, and cellulose fibres rendered non-absorptive by treatment.

FRIEDRICH SCHOENBECK.
ERICH CZAPP.